March 4, 1958     D. C. MULLER     2,825,476
CONTROL MEANS FOR CONVEYOR AND ASSOCIATED APPARATUS
Filed March 9, 1956     2 Sheets-Sheet 1

INVENTOR
DONALD C. MULLER
BY
ATTORNEYS

March 4, 1958 D. C. MULLER 2,825,476
CONTROL MEANS FOR CONVEYOR AND ASSOCIATED APPARATUS
Filed March 9, 1956 2 Sheets-Sheet 2

INVENTOR
DONALD C. MULLER
BY
Mason & Graham
ATTORNEYS

United States Patent Office 2,825,476
Patented Mar. 4, 1958

2,825,476

CONTROL MEANS FOR CONVEYOR AND ASSOCIATED APPARATUS

Donald C. Muller, Whittier, Calif., assignor to A. J. Bayer Company, Los Angeles, Calif., a corporation of California Application March 9, 1956, Serial No. 570,637

5 Claims. (Cl. 214—11)

This invention has to do with material-handling apparatus and particularly with means for automatically handling articles traveling on a conveyor in accordance with manually operative pre-selection means under control of an operator to determine the destination of an article or to select some operation which is to be performed as the article reaches any one of several given stations or points in its travel along the conveyor.

An object of the invention is to provide novel means for controlling the operation of a plurality of devices along a conveyor in order that a selected device will operate at the instant a particular article reaches a given point on the conveyor, such as directly opposite the selected device. By way of example, the invention is particularly suited for controlling the distribution or sorting of articles wherein the articles travel on a main conveyor and are selectively pushed or shunted off therefrom onto branch conveyors located along the main conveyor by means of devices located at the various shunting points or stations.

A further object is to provide means for controlling the operation of devices along a conveyor or the like embodying novel means for timing or synchronizing the operation of a selected device with the travel of an article along the conveyor. In this connection it is an object to provide a novel arrangement and combination of elements wherein a signal is impressed upon or imparted to a signal carrier member operating in synchronism with the conveyor by apparatus acting in response to a timing mechanism which determines when an article is centered with respect to a given reference point, and in which means is provided for each operation-performing device to pick up a signal intended for it at the correct time and cause the operation-performing device to function.

Another object is to provide apparatus of the type indicated which incorporates safety means for preventing use of the apparatus in ways other than intended and in ways which might damage the apparatus or articles on the conveyor.

These and other objects will be apparent from the drawing and the description which follows.

Figure 1:
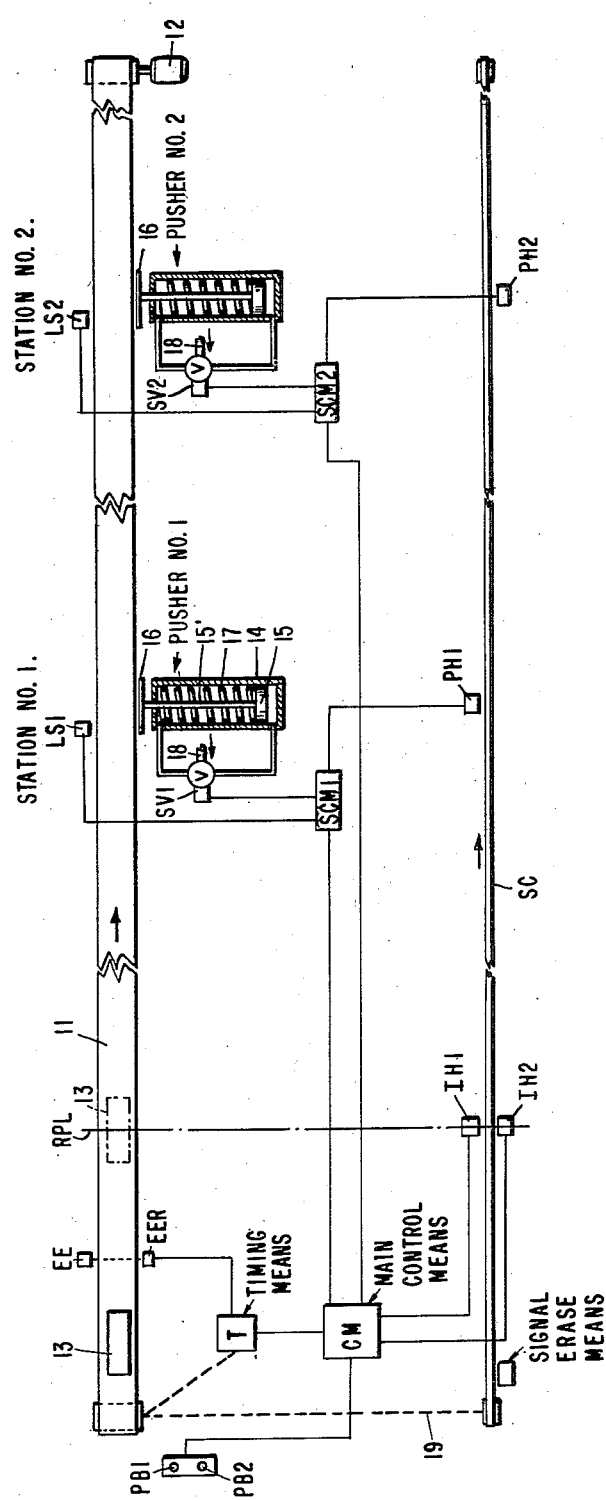
Fig. 1 is a diagrammatic view of apparatus embodying the invention.

More particularly describing the invention, 11 designates an endless conveyor, the usable run of which travels in the direction of the arrow thereon, the conveyor being driven by a motor 12. Spaced along the conveyor may be a plurality of stations (only two are shown) at each of which is an operation-performing device, which, if pre-selected, operates at the approximate instant a given article 13 on the conveyor is centered opposite it. The devices may be designed to perform any desired function, but for convenience they are shown as devices for pushing articles off the conveyor and are designated Pusher #1 and Pusher #2. Each pusher comprises a cylinder 14, piston 15, piston rod 15' and a head 16, the latter being designed to travel across the conveyor to push an article therefrom. It may be assumed that at each station there is a chute or a branch conveyor to carry away articles pushed off the conveyor 11, although none is shown.

The pusher pistons are normally spring-retracted by springs 17 as shown, and are controlled by a solenoid valve. The valves are designated SV1 and SV2 respectively in fluid lines 18 which may lead to a source of air or other fluid under pressure.

I provide a signal carrier, designated SC which may be a magnetic tape or the like. This is an endless member which is driven in synchronism with the conveyor either directly as indicated on the drawing by broken line 19 or by synchronous motors. Spaced along the signal carrier at distances and locations corresponding to the stations along the conveyor are signal receivers or pickup heads, designated PH1 and PH2. As a practical matter it may be advisable to make the signal carrier much shorter than the conveyor and to run it at a correspondingly slower speed in which case the signal receivers would be correspondingly more closely spaced and closer to the head end of the signal carrier.

RPL designates a reference point line. As will later appear, when an article is centered on this line, the pre-selected signal is applied to the signal carrier by the appropriate electrical impulse head IH1 or IH2. It is to be noted that these are located on this reference point line, that is, the signal is imparted to the signal carrier at a point therealong corresponding to the location of the center of the article on conveyor 11. Thus the signal travels along the signal carrier simultaneously with the travel of the article along the conveyor and arrives at a pickup head at the same time that the article is centered at the corresponding station along the conveyor.

I provide electric eye means which includes the electric eye lamp EE and the beam receiver and relay actuation means for a relay EER. The latter actuates a timing means T which determines when an article 13 on the conveyor is centered at the reference point line RPL, and, at that instant serves to indirectly actuate the appropriate impulse head IH to place a signal on the carrier member SC. The above is based on the assumption that certain circuits have previously been set up in the main control means CM through the operation of one of the selector switches PB1 or PB2.

With the above in mind, the general operation is as follows. An operator selects the destination of an article before the article reaches the photoelectric eye beam and closes the appropriate switch, either PB1 or PB2. This sets up certain relay circuits in the main control means CM. Subsequently the article cuts the beam, starting the timing means. The article later passes through the beam, restoring it. The timing means then determines when the article is centered (from front to rear) on the reference point line RPL. At that instant, the timing means actuates or completes previously setup circuits in CM with the result that the appropriate impulse head IH imparts a signal to the signal carrier. The signal travels along the signal carrier and arrives at the pickup head PH for the selected station at the same time that the article is centered at the selected station. The pickup is connected to a station control means SCM which operates a solenoid valve (SV1 or SV2) to operate the pusher. A limit switch (LS1 or LS2) is contacted by the pusher head at the limit of its stroke and this affects certain circuits which serve to restore the elements to normal.

Figure 2:
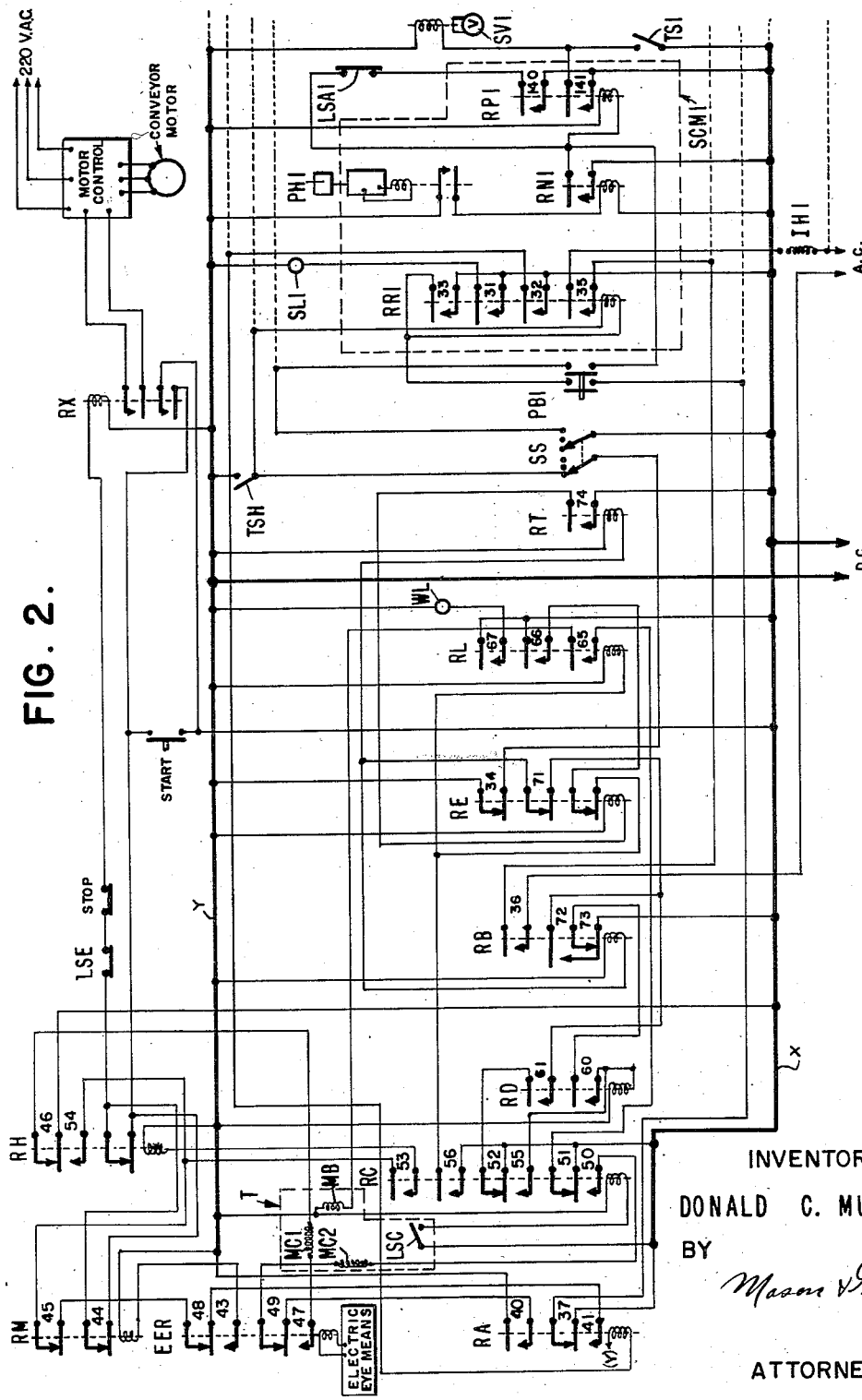
Fig. 2 is a schematic wiring diagram of the principal electrical components of the invention.

Fig. 2 shows schematically the various electrical components. In the interest of succinctness and clarity, I will describe these in terms of their function. Due to lack of space, only the controls for Station No. 1 are shown, but it should be obvious to those skilled in the art how controls for as many additional stations as desired may be connected into the basic circuits shown. Leads in broken lines have been shown for this purpose.

By way of example it will be assumed the operator desires to have an article removed from the conveyor at the first station. To do this, he closes switch PB1 before the article reaches the electric eye beam, thereby energizing relay RR1. Contacts 31 of the latter close completing a circuit through indicator lamp SL1 which may be associated with PB1. Also, contacts 32 close energizing relay RA. Further, contacts 33 close establishing a holding circuit through manual switch SS and contacts 34 of relay RE. Energizing of RR1 also sets up a circuit through contacts 35 for the impulse head IH1, the circuit being open at contacts 36 of relay RB.

Energization of relay RA opens contacts 37 thereof in the circuit of the manually operative selector switches PB1 etc., thereby preventing a second switch of any additional units (not shown in Fig. 2 but which would be connected into this circuit) from having any effect if inadvertently closed. Contacts 40 and 41 close setting up circuits to the photoelectric eye relay EER.

As an article on the conveyor cuts the photoelectric eye beam, relay EER is energized. This energizes relay RM through contacts 43. Contacts 44 of RM open one leg of a parallel line in the conveyor stop circuit while contacts 45 open preparatory. Closing of contacts 47 of EER energizes a magnetic clutch MC1 of the timing device T, the circuit passing through contacts 40 of relay RA and contacts 46 of relay RH. The timing device will not be shown or described in detail since it may be the same as that disclosed in my copending application, Serial No. 416,157, filed March 15, 1954. Essentially the timer comprises a rotary cam which when moved from its normal position closes a limit switch (LSC, Fig. 2). The cam is coupled by a first magnetic clutch MC1 to a first set of gears which drives the member during the time the electric eye is interrupted. When the eye beam is restored the magnetic clutch MC1 is disengaged and a second magnetic clutch MC2 couples the member to a second set of gears which returns the rotary member to its original position at twice its original speed to again open the switch LSC.

The closing of switch LSC energizes relay RC. Contacts 50, 51, 52 and 53 thereof shift setting up circuits for a later action. Contacts 55 close energizing relay RD, and contacts 56 close energizing relay RL. Contacts 60 of RD close establishing a holding circuit through RB for relay RD. Contacts 61 close preparatory.

Energization of relay RL closes contacts 65 thereof, preparatory. Also contacts 66 close establishing a holding circuit for RL through RE, and contacts 67 close lighting the warning lamp WL.

When the article passes completely through the photoelectric eye beam restoring the same, relay EER returns to normal. Its contacts 43 open releasing RM and its contacts 47 open deenergizing clutch MC1. This relay also energizes clutch MC2 (part of the timing means) through contacts 49 and through contacts 40 of RA and 50 of RC. Shifting of relay EER also energizes relay RH through contacts 53 of RC, contacts 45 of RM and contacts 41 of RA. RH is held through its contacts 54. When the timing or centering means completes its action, LSC is opened releasing relay RC. The latter releases MC2 as contacts 50 open. It also closes a circuit through a magnetic brake MB of the timing mechanism, the circuit passing through contacts 51 of RC and 65 of RL. Dropping of RC also does the following: closes contacts 52 thereof energizing relays RB and RT, the circuit passing through contacts 61 of RD and contacts 71 of RE; opens contacts 55 in the initial energizing circuit of RD; opens contacts 56 in the initial energizing circuit of RL; and opens contacts 53, dropping RH.

The energization of relay RB does the following: establishes its own holding circuit through its contacts 72 and through relay RE; contacts 72 closing just before contacts 73 open, dropping relay RD; closes contacts 36 completing a circuit through contacts 35 of RR1 to energize impulse head IH1 which imparts a signal to the tape.

The relay RT, which was energized when RC returned to normal, is a delayed action relay arranged to close a predetermined time interval after energization. It may be set for one half (½) second delay. When its contacts 74 close, it energizes relay RE. The latter opens circuits to relays RL, RB and RT, and RR1, releasing them.

The deenergization of RL releases the magnetic brake MB of the timing means and opens the circuit to the warning light WL. It also, through the opening of contacts 66, sets up a circuit for a later operation.

The release of RB opens contacts 36 in the impulse head circuit thereby discontinuing the signal impressed on the tape by IH1. The release of RT opens the holding circuit of RE, dropping the latter.

The apparatus has now returned to normal and is ready for the next article. In the meantime the first article is traveling toward the selected station.

Before considering what takes place when the signal is received by the pickup head of the selected operation-performing device, the following features may be pointed out. If the operator pushes the wrong switch button, the error can be rectified if the article has not cut the photoelectric eye beam by opening the selector switch SS. If it is desired to send an article to the end of the conveyor without having any of the operation-performing devices function this can be done merely by refraining from closing any of the station selector switches (PB1, etc.) since the interruption of the photoelectric eye beam without having first closed one of the station selector switches, has no effect on the timing system.

When the signal is picked up by the receiving or pickup head PH1 it is amplified energizing relay RN1. The latter closes a circuit through relay RP1 which is held through its contacts 140. Relay RP1 closes the circuit through the solenoid valve SV1 as contacts 141 close. The hold circuit for RP1 includes a limit switch LSA1 which is opened by the head of pusher device #1 at the end of its travel. The solenoid valve admits pressure fluid to the cylinder 14 to cause its piston to operate. The opening of the limit switch drops relay RP1 which in turn opens the circuit at a second point to the solenoid valve. The latter is a spring return valve, which, when released causes the pusher to return to original position.

As previously indicated, it will be apparent to those skilled in the art how additional control components may be connected into the basic circuits shown in Fig. 2 as required for additional stations. For each station this would require another pushbutton selector switch, additional relays RR, RN and RPI as well as an additional pick-up head PH and impulse head IH.

In the operation of the apparatus it will be apparent that a second article should not be allowed to interrupt the electric eye beam until the warning light WL has been extinguished by the return of relay RL to normal. In the event this does not occur the conveyor will be stopped by reason of the fact that relay EER will be prematurely energized thereby.

The conveyor may be restarted after the offending article has been moved from the area of the beam.

A feature of the invention is the fact that each pusher may be tested by the operator merely by closing the selector switches TV provided that the switch SS has been moved from the extreme left position of Fig. 2 to the extreme right position thereof. When the pushbutton PB1 is closed it will then directly energize relay RPI and this will close the circuit through SVI controlling the Pusher #1.

It may also be pointed out that if a number of articles are destined for one station, automatic operation may be maintained by closing switch TSH and then pushing the desired station selector switch WB. This station will then be held in the circuit.

I claim:

1. In apparatus for use as described, a driven conveyor a single signal carrier driven in synchronism with said conveyor, a plurality of operation-performing devices spaced along the conveyor, an actuating means for each device including a signal-pickup element associated with the signal carrier at a point therealong corresponding to the location of its corresponding device along the conveyor, article-detecting means at a given point along the conveyor ahead of said devices, a timing mechanism actuated by said article-detecting means for determining when an article reaches a position such that the center of the article from front to rear in the direction of its travel is at a given reference point along the conveyor beyond said given point, a normally inactivated signal-imparting means for each operation-performing device including a signal-imparting head associated with said signal carrier member at a point therealong corresponding in position to that of the reference point along the conveyor, manually operable selector means for activating a selected signal-imparting means, and means operatively connecting said timing mechanism with each of said signal-imparting means for actuating the activated signal-imparting means when an article on the conveyor has reached said reference point.

2. The apparatus set forth in claim 1 in which means is provided for preventing activation of a second signal-imparting means until said timing mechanism has completed its function of actuating a previously activated signal-imparting means.

3. In apparatus for use as described, a conveyor, means for driving the conveyor, a plurality of operation-performing devices spaced along the conveyor, article-detecting means at an initial given point along the conveyor ahead of said devices, a timing mechanism actuated by said article-detecting means for determining when an article on the conveyor reaches a position such that the center of the article from front to rear in the direction of its travel is at a given reference point along the conveyor beyond said initial given point, a single endless signal carrier member driven at a speed proportionate to that of the conveyor, a normally inactivated signal-imparting means for each operation-performing device including a signal-imparting head associated with said signal carrier member at a point therealong corresponding in position to that of the reference point along the conveyor, a signal-pickup member for each operation-performing device associated with said signal carrier member and positioned therealong at a point proportionately corresponding to the point of location along the conveyor of its corresponding operation-performing device from said reference point, actuating means for each operation-performing device associated with the signal-pickup member of such device, effective, upon reception of a signal by the signal-pickup member, to actuate the associated device, manually operable selector means for activating a selected signal-imparting means, and means operatively connecting said timing mechanism with each of said signal-imparting means for actuating the activated signal-imparting means when an article on the conveyor has reached said reference point.

4. Apparatus as set forth in claim 3 in which means is provided for operably directly connecting said selector means to the actuating means for each operation-performing device and for rendering ineffective said timing mechanism, and said signal-imparting means, whereby to permit of direct actuation of said actuating means for each operation-performing device by said selector means.

5. Apparatus as set forth in claim 3 in which means is provided for preventing activation of a second signal-imparting means until said timing mechanism has completed its function of actuating a previously activated signal-imparting means.

References Cited in the file of this patent

UNITED STATES PATENTS 2,587,686    Berry _____ Mar. 4, 1952